United States Patent Office 3,142,681
Patented July 28, 1964

3,142,681
BASIC ESTERS OF 5-HYDROXYDIBENZO [a,d] [1,4] CYCLOHEPTADIENE-5-CARBOXYLIC ACID
Martin A. Davis, Montreal, Quebec, Canada, assignor to American Home Products Corporation, New York, N.Y., a corporation of Delaware
No Drawing. Filed July 6, 1962, Ser. No. 208,108
7 Claims. (Cl. 260—294.3)

This invention relates to certain new chemical compounds having pharmacological activities, and to the processes used for their preparation.

More particularly, my invention is directed to basic esters of 5-hydroxydibenzo[a,d][1,4]cycloheptadiene-5-carboxylic acid which may be represented by the following formula:

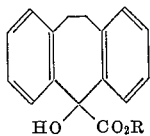

wherein R is a radical selected from the group which consists of 2-diethylaminoethyl, N-methyl-3-piperidyl, and N-methyl-2-pyrrolidylmethyl; and acid addition salts of these basic esters.

The 2-diethylaminoethyl group is the group

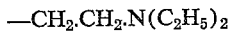

whereas N-methyl-3-piperidyl is

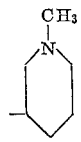

and N-methyl-2-pyrrolidylmethyl is the group

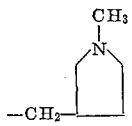

This invention is also intended to include the water soluble acid addition salts of these novel basic esters, such salts being pharmacologically equivalent to the corresponding free bases, and being formed from non-toxic, pharmacologically-acceptable acids such as, for example, hydrochloric, phosphoric, maleic, or succinic acids and the like.

It is an object of this invention to make available new and valuable medicinal agents which have utility as antispasmodic agents. This antispasmodic action is of the atropine type, that is the compounds are capable of inhibiting the contractions caused by the action of acetylcholine on the isolated guinea pig ileum. They also cause mydriasis when given to intact animals. Antispasmodic agents of this class are useful in the treatment of gastrointestinal, genitourinary, or biliary tract disorders, as well as being valuable as mydriatics and cycloplegics in ocular inflammations.

In addition, at least one of the compounds of this invention, the compound diethylaminoethyl 5-hydroxydibenzo[a,d][1,4]cycloheptadiene - 5 - carboxylate, exhibits valuable effects upon the central nervous system in inhibiting convulsions caused by electroshock and in potentiating barbiturate hypnosis.

The compounds of this invention may be administered orally either as compressed tablets, or as dry powder capsules formulated with pharmacologically acceptable carriers such as, for example, lactose, starch, magnesium stearate, and the like, or as solutions of their acid addition salts in aqueous vehicles, the latter form serving as a convenient route for topical application or for administration by injection.

The novel basic esters of this invention may be secured from the interaction of a basic halide with 5-hydroxydibenzo[a,d][1,4]cycloheptadiene-5-carboxylic acid in an appropriate solvent and at an elevated temperature. In practice it is convenient to carry out the reaction in boiling isopropanol for a period of time sufficient to allow essentially complete interaction of the reagents, generally from about 12 to 20 hours. Chilling of the reaction mixture then gives the hydrohalide salt of the basic ester, which may be collected by filtration.

Interaction of 2-diethylaminoethyl chloride with the above-mentioned carboxylic acid gives the hydrochloride of the corresponding 2-diethylaminoethyl ester. The use of N-methyl-3-chloropiperidine gives, on the other hand, a mixture of the hydrochlorides of two isomeric esters, viz, the N-methyl-3-piperidyl and the N-methyl-2-pyrrolidylmethyl esters. This is due to the well-known rearrangement of the N-substituted-3-chloropiperidines in this type of reaction as disclosed inter alias by J. H. Biel, L. G. Abood, W. K. Hoya, H. A. Leiser, P. A. Nuhfer and E. F. Kluchesky in J. Org. Chem. 26, 4096 (1961), and by E. G. Brain, F. P. Doyle and M. D. Mehta in J. Chem. Soc., 1961, 633.

It is possible to resolve this mixture into its components by chromatography. Thus, thin-layer chromatography of the hydrochlorides on silica gel using a methanol-ethyl acetate solvent gives the two individual hydrochlorides, while the corresponding bases may be resolved by using a methanol-benzene solvent. In order to conveniently secure the desired N-methyl-3-piperidyl ester it is possible to convert the mixture of the isomeric hydrochlorides to the corresponding free bases, followed by thermal rearrangement of the latter as disclosed by Biel et al.

The isomeric mixture of hydrochlorides is thus dissolved in water and treated with sodium bicarbonate; and the resulting product is then collected, dried and heated to an elevated temperature. In practice it is convenient to heat for about one hour at a temperature of about 200° C. in an appropriate sublimation apparatus. The system is then evacuated to a low pressure, whereupon continued heating causes the product to sublime, giving the chromatographically pure N-methyl-3-piperidyl ester. This free base may then be converted to a water-soluble acid addition salt, such as, for example, the hydrochloride salt, by treatment with hydrogen chloride in the usual manner.

The required intermediate, 5-hydroxydibenzo[a,d] [1,4]cycloheptadiene-5-carboxylic acid, may be prepared by the reductive metalation by potassium in liquid ammonia of dibenzo[a,d][1,4]cycloheptadiene-5-one, with subsequent carbonation as disclosed in my co-pending application Ser. No. 204,051, filed June 21, 1962, now Patent No. 3,138,608, issued June 23, 1964.

The procedures employed may be diagrammatically indicated as follows:

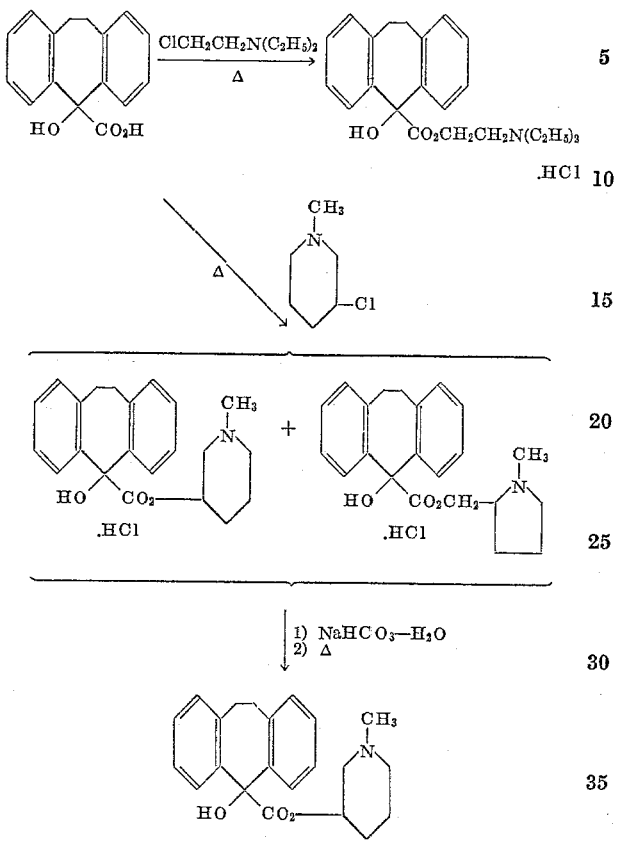

My invention is illustrated by the following examples.

Example 1

A mixture of 5-hydroxydibenzo[a,d][1,4]cycloheptadiene-5-carboxylic acid (4.0 g., 0.016 mole) and 2-diethylaminoethyl chloride (2.1 g., 0.016 mole) in dry isopropanol (50 ml.) was heated under reflux for 12 hours. The mixture was chilled, and the precipitated solid was filtered off and recrystallized once from nitromethane-ether to give 3.5 g. (57% yield) of 2-diethylaminoethyl 5-hydroxydibenzo[a,d][1,4]cycloheptadiene - 5 - carboxylate hydrochloride; M.P. 227–228° C. (dec.) as rosettes of small needles. An analytically pure sample had M.P. 228–229° C. (dec.).

Analysis confirmed the empiric formula $C_{22}H_{28}ClNO_3$. Required: C, 67.78; H, 7.24; Cl, 9.10%. Found: C, 67.90; H, 7.31; Cl, 9.22, 9.16%.

A portion of the hydrochloride salt was dissolved in water and the solution was rendered alkaline by the addition of sodium carbonate. The liberated base was collected in ether, the ether layer separated and evaporated, and the residue recrystallized from ethanol-hexane mixture. There was obtained 2-diethyl-aminoethyl 5-hydroxydibenzo[a,d][1,4]cycloheptadiene-5-carboxylate as white crystals, M.P. 116–117° C.

Example 2

A mixture of 5-hydroxydibenzo[a,d][1,4]cycloheptadiene-5-carboxylic acid (6.35 g., 0.025 mole) and N-methyl-3-chloropiperidine (3.32 g., 0.025 mole) in dry isopropanol (60 ml.) was heated under reflux for 19 and one-half hours. The yellow solution was evaporated in vacuo, i.e. at a pressure below atmospheric, and the residual gum was taken up in water (500 ml.) containing a small amount of hydrochloric acid. The aqueous mixture was extracted with ether and then made alkaline by the addition of sodium bicarbonate. The liberated product was taken up in benzene and the benzene layer separated and evaporated to give 8.2 g. of a colourless oil. On trituration with hexane the oil solidified to furnish 4.9 g. of a mixture of isomeric bases, M.P. 145–154° C., the infrared spectrum of which showed a split carbonyl band at 1722 cm.$^{-1}$ and 1745 cm.$^{-1}$ due to the presence of N-methyl-3-piperidyl and the N-methyl-2-pyrrolidyl esters, respectively. The band at 1745 cm.$^{-1}$ was the more intense.

These two isomeric bases were separated and isolated as follows: thin-layer chromatography of a portion of this material on silica gel G (Merck and Co.) using a 10% methanol in benzene solvent system separated the N-methyl-3-piperidyl ester of 5-hydroxydibenzo[a,d][1,4]-cycloheptadiene-5-carboxylic acid, characterized by its $R_F$ value of 0.55±0.05, from an approximately equal amount of the corresponding N-methyl-2-pyrrolidylmethyl esters, characterized by its $R_F$ value of 0.42±0.05.

Furthermore, a sample of the mixture of the two isomeric esters was treated with a small excess of ethereal hydrogen chloride. The resulting mixture of hydrochlorides of the isomeric esters (P.M. 207–208° C. (dec.)) could be resolved into the two components by thin-layer chromatography on silica gel using a 1:1 mixture of methanol-ethyl acetate. Thus, the hydrochloride of the N-methyl-3-piperidyl ester had $R_F$ value of 0.65±0.05, while the hydrochloride of the isomeric N-methyl-2-pyrrolidylmethyl ester had $R_F$ value of 0.57 ±0.05 in this particular system.

The mixture of isomeric bases was heated in a sublimation apparatus under atmospheric pressure at 200° C. for one hour. The pressure was then reduced to about 0.1 mm. of mercury pressure, and heating was continued until all of the material had sublimed. The sublimate was recrystallized from nitromethane to afford a sample of N-methyl-3-piperidyl 5-hydroxydibenzo[a,d][1,4]cycloheptadiene-5-carboxylate, M.P. 211–212° C. (dec.).

Analysis confirmed the empiric formula $C_{22}H_{25}NO_3$. Required: C, 75.18; H, 7.17%. Found: C, 75.51; H, 7.63%.

Thin-layer chromatography of this material showed only the one spot of the N-methyl-3-piperidyl ester as described above, while the infrared spectrum had the strong characteristic band at 1720 cm.$^{-1}$. The ultraviolet spectrum exhibited an absorption maximum at 266 m$\mu$ ($\epsilon$= 796).

The basic ester was converted to the hydrochloride salt by treatment with hydrogen chloride. Recrystallization of this product from nitromethane gave the hydrochloride of N-methyl-3- piperidyl 5-hydroxydibenzo[a,d][1,4]cycloheptadiene-5-carboxylic acid in the form of fine needles, M.P. 226–227° C. (dec.), while recrystallization from methanol afforded small cubes, M.P. 218–219° C. (dec.), the two forms being mutally interconvertible. The use of methanol afforded a stable solvate of the product.

Analysis confirmed the empiric formula $$C_{22}H_{26}ClNO_3 \cdot CH_3OH$$

Required: C, 65.80; H, 7.20; Cl, 8.44%. Found: C, 65.67; H, 7.10; Cl, 8.62, 8.63%.

Chromatographic analysis of this salt demonstrated the presence of the single isomer.

I claim:

1. A chemical compound selected from the group consisting of compounds of the formula

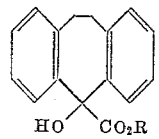

where R is selected from the group consisting of 2-diethylaminoethyl, N-methyl-3-piperidyl and N-methyl-2-pyrrolidylmethyl; and hydrohalide salts of said compounds.

2. 2-diethylaminoethyl 5-hydroxydibenzo[a,d][1,4]-cycloheptadiene-5-carboxylate.

3. N-methyl-3-piperidyl 5-hydroxydibenzo[a,d][1,4]-cycloheptadiene-5-carboxylate.

4. N-methyl-2-pyrolidylmethyl 5-hydroxydibenzo[a,d][1,4]cycloheptadiene-5-carboxylate.

5. The hydrochloride salt of 2-diethylaminoethyl 5-hydroxydibenzo[a,d][1,4]cycloheptadiene-5-carboxylic acid.

6. The hydrochloride salt of N-methyl-3-piperidyl 5-hydroxydibenzo[a,d][1,4]cycloheptadiene - 5 - carboxylic acid.

7. The hydrochloride salt of N-methyl-2-pyrrolidylmethyl 5-hydroxdibenzo[a,d][1,4]cycloheptadiene-5-carboxylic acid.

No references cited.